United States Patent
Gonzalez

[11] Patent Number: 5,852,846
[45] Date of Patent: Dec. 29, 1998

[54] WINDSHIELD AIRSTREAM DEFLECTOR FOR VEHICLES

[76] Inventor: E. H. Gonzalez, P.O. Box 13931, Tucson, Ariz. 85732

[21] Appl. No.: 785,040

[22] Filed: Jan. 17, 1997

[51] Int. Cl.$^6$ ........................................................ B60S 1/54
[52] U.S. Cl. ................................................. 15/313; 15/405
[58] Field of Search ........................................ 15/313, 405

[56] References Cited

U.S. PATENT DOCUMENTS

| | | |
|---|---|---|
| D. 324,667 | 3/1992 | Williams . |
| 1,537,951 | 5/1925 | Korach . |
| 1,717,904 | 6/1929 | Abernethy . |
| 1,722,265 | 7/1929 | Beaulieu . |
| 3,423,026 | 1/1969 | Carpenter . |
| 5,097,563 | 3/1992 | Cowan . |
| 5,140,719 | 8/1992 | Cowan . |
| 5,197,287 | 3/1993 | Okimoto et al. . |
| 5,419,005 | 5/1995 | Mori . |
| 5,486,139 | 1/1996 | Papp . |
| 5,617,608 | 4/1997 | Primlani ..................................... 15/313 |

FOREIGN PATENT DOCUMENTS

| | | | |
|---|---|---|---|
| 2338597 | 2/1975 | Germany ................................. 15/313 |
| 269761 | 11/1988 | Japan ........................................ 15/313 |
| 24248 | 1/1990 | Japan ........................................ 15/313 |
| 105036 | 4/1993 | Japan ........................................ 15/313 |

*Primary Examiner*—Chris K. Moore
*Attorney, Agent, or Firm*—Richard C. Litman

[57] ABSTRACT

A windshield airstream deflector for vehicles which projects a blanket of fast moving air over the vehicle's windshield. The blanket of fast moving air is a barrier which prevents rain, snow, freezing rain or sleet from impacting the windshield. A turbine accelerates fresh air over the windshield via windshield ducts. A heating element is selectively operated to heat the air to aid defrosting of the windshield. Attached to the end of the windshield duct is a windshield exhaust duct which distributes the blanket of fast moving air equally over the windshield. An electrical heating element is disposed on the windshield exhaust duct to prevent or dispel any buildup of ice on the windshield exhaust duct. Power to drive the turbine comes from either the engine via a belt attached to the engine and turbine via a shaft, a direct current motor which has a battery as the power supply, or from the vehicle exhaust system via a dual turbine.

18 Claims, 6 Drawing Sheets

WINDSHIELD AIRSTREAM DEFLECTOR FOR VEHICLES

BACKGROUND OF THE INVENTION

1. Field of the Invention

The present invention relates generally to windshield air or rain deflectors. More specifically, the invention relates to a windshield airstream deflector system that forces a fast moving blanket of air over the windshield of vehicles to prevent rain, insects, and other small airborne objects from impacting the windshield.

2. Description of Prior Art

Motor vehicle drivers often experience difficulty in safely navigating their vehicles because of the accumulation of water on their windshields during heavy rains. The rapid collection of rain water greatly reduces visiblity, which in turn leads to traffic accidents. Brisk snow falls and driving on dirt roads also restricts the drivers visibility, which contributes to dangerous driving conditions. As can be easily envisioned, many other airborne objects can obscure a windshield from the exterior and lead to a visibility problem.

In an attempt to solve the problem, motor vehicles have been equipped with mechanisms that are designed to clean vehicle windshields. First and most commonly, conventional windshield wiper systems consist of one or two lever arms which secure a rubber blade. The rubber blade or wiper is designed to clear the windshield of water or debris. Unfortunately, the design of the wipers (traversing from one side of the windshield to the other) often adds to the loss of visibility. In addition, as the rubber on the wiper wears down, the wiper begins to lose its effectiveness. When this happens, instead of cleaning the windshield, the wiper simply smears the windshield. Often, when the wiper reaches this stage it actually reduces visibility rather than increasing it.

Another drawback with the conventional wiper system is that the wipers are ineffective against ice or moisture condensation. In freezing rain conditions the wiper blades, in addition to the windshield, can become frozen which greatly reduces their effectiveness. In these situations, it becomes necessary for the driver to exit his vehicle, manually clean the blades, and then reenter his vehicle. As would be expected, this is not practical or advisable on most highways. Thus, the conventional wiper-blade system has many disadvantages.

However, unlike the wiper-blade system, a system which forces a blanket of fast-moving, selectively heated air over the windshield can displace freely falling water, snow and dirt away from or over the windshield. In addition, the blanket of air serves as a barrier against ambient air impacting the windshield as a vehicle passes through surrounding air. Furthermore, heated air can act as a defogger and a de-icer. There is, therefore, the need for a windshield wiping system which utilizes a fast moving blanket of air wherein the air is forced over the windshield such that rain, snow or dirt is efficiently and effectively removed from the windshield.

Windshield wiping systems using streams of air have been described in the patent literature. For example, U.S. Pat. Nos. 5,486,139 issued to Papp on Jan. 23, 1996, 5,140,719 issued to Cowan on Aug. 25, 1992, 5,097,563 issued to Cowan on Mar. 24, 1992, 3,423,026 issued to Carpenter on Jan. 21, 1969, 1,537,951 issued to Korach on May 19, 1925, 5,419,005 issued to Mori on May 30, 1995, and Des. 324,667 issued to Williams on Mar. 17, 1992, all describe air wiper systems, but fail to disclose an windshield airstream deflector which uses a turbine or turbo system wherein air is supplied from the air intake wherein the air is passed through an air filter and then through a selectively operated heating element. Furthermore, none of the above cited patents disclose air output vents having guide rails to direct the flow of air over the windshield.

U.S. Pat. Nos. 1,722,265 issued to Beaulieu on Mar. 26, 1928, and 1,717,904 issued to Abernethy on Jun. 18, 1929 both describe air cleaning systems but fail to disclose and air wiper system wherein air supplied from an air intake is directed over the vehicle windshield.

U.S. Pat. No. 5,197,287 issued to Okimoto et al. on Mar. 30, 1993 describes an exhaust control system using dual turbochargers but fail to disclose an air wiper system using a turbo or turbine system to propel a blanket of air over a vehicle windshield.

None of the above inventions and patents, taken either singularly or in combination, is seen to describe the instant invention as claimed. Thus a air/rain deflector for vehicles solving the aforementioned problems is desired.

SUMMARY OF THE INVENTION

The invention relates to a windshield airstream deflector system which forces a blanket of air over the surface of a vehicle's windshield. The blanket of air acts as a shield which prevents rain, snow, sleet or freezing rain, insects, airborne debris, and the like, from accumulating upon the windshield. Ambient air enters an air intake valve and is drawn through an air filter by the blades of a turbine. In a first embodiment, a constant speed drive turns the blades of the turbine at a constant speed, the drive driven either electrically or by a belt system linked to the engine of the motor vehicle. In a second embodiment, intended primarily for tractor-trailer rigs, a first turbine is driven by a second turbine placed in the stream of exhaust gases flowing through and out of the exhaust system of the engine. The second embodiment employs the exhaust pressure of the exhaust system to synchronously drive the blades of the first turbine, the exhaust system being closed relative to the associated system of the first turbine. A pair of valves placed in the exhaust system pipes shunt the exhaust gases either across the turbine or bypass it for on-off operation.

Both embodiments then propel the air over a heating element, and out of a flared windshield exhaust duct terminating the system. The windshield exhaust duct contains an air nozzle positioned below the windshield. The windshield exhaust duct and air nozzle are dimensioned and configured to exhaust air over substantially all of the length of the windshield. Located within the windshield exhaust duct are a plurality of air flow guides. These air guides internally divide the windshield exhaust duct into a plurality of passages which direct compressed air to the air nozzle. In turn, the air nozzle is divided by air nozzle guides into a plurality of evenly spaced outlets which direct air over the windshield such that a uniform blanket of air is created and evenly directed over the windshield. A selectively activated electrical heating element is disposed on the air nozzle to prevent the outlets and air nozzle from clogging from frozen precipitation during freezing rain, ice or snow conditions.

Accordingly, it is a principal object of the invention to provide a windshield airstream deflector system which forces a blanket of air over the windshield.

It is a further object of the invention to provide a windshield airstream deflector which uses a turbine to generate the blanket of air.

Still another object of the invention is to provide a windshield airstream deflector which uses a heating element to heat the blanket of air.

It is another object of the invention to provide a windshield airstream deflector wherein the air blanket is generated by a turbine driven either electrically, by a belt system, or exhaust pressure.

It is also an object of the invention to provide a windshield airstream deflector wherein the windshield exhaust duct terminating in an air nozzle having a plurality of nozzle air fin guides for even distribution of air across the entirety of the windshield.

Yet another object of the invention is to provide an air nozzle having an electrical heating element which prevents the air nozzle from clogging from frozen precipitaton.

It is yet again an object of the invention to provide a heating element and electrical heating element that are activated or deactivated by the driver.

It is an object of the invention to provide improved elements and arrangements thereof in an windshield airstream deflector for vehicles for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The invention relates to a windshield airstream deflector system which forces a blanket of air over the surface of a vehicle windshield. The blanket of air acts as a shield which prevents rain, snow, sleet or freezing rain, insects, airborne debris, and the like, from accumulating upon the windshield. Moreover, the blanket of air generated by the windshield airstream deflector prevents ambient air from impacting the windshield, resulting in increased fuel efficiency due to a reduction in air resistance.

Common to all embodiments, ambient air enters an air intake valve and is drawn through an air filter by the blades of a multi-stage turbine. In a first embodiment, a constant speed drive turns the blades of the turbine at a constant speed, the drive driven either electrically or by a belt system linked to the engine of the motor vehicle. In a second embodiment, intended primarily for tractor-trailer engines, a first multi-stage turbine is driven by a second turbine placed in the stream of exhaust gases flowing through and out of the exhaust system of the engine. The second embodiment employs the exhaust pressure of the exhaust system to synchronously drive the blades of the first turbine, the exhaust system being closed relative to the associated system of the first multi-stage turbine. A pair of valves placed in the exhaust system pipes shunt the exhaust gases either across the turbine or bypass it, for on-off operation.

Each embodiment then propels the air over a heating element, having means to be activated or deactivated by the driver, and out of a flared windshield exhaust duct terminating the system. The windshield exhaust duct contains an air nozzle positioned below the windshield. The windshield exhaust duct and air nozzle is dimensioned and configured to exhaust air over substantially the entire length of the windshield. Located within the windshield exhaust duct are a plurality of air flow guides. These air guides internally divide the windshield exhaust duct into a plurality of passages which direct compressed air generated by the multi-stage turbine to the air nozzle. In turn, the air nozzle is divided by air nozzle guides into a plurality of evenly spaced outlets which direct air over the windshield such that a uniform blanket of air is created and evenly directed over the windshield. A selectively activated electrical heating element is disposed on the air nozzle to prevent the outlets and air nozzle from clogging from frozen precipitation during freezing rain, ice or snow conditions.

Figure 1:
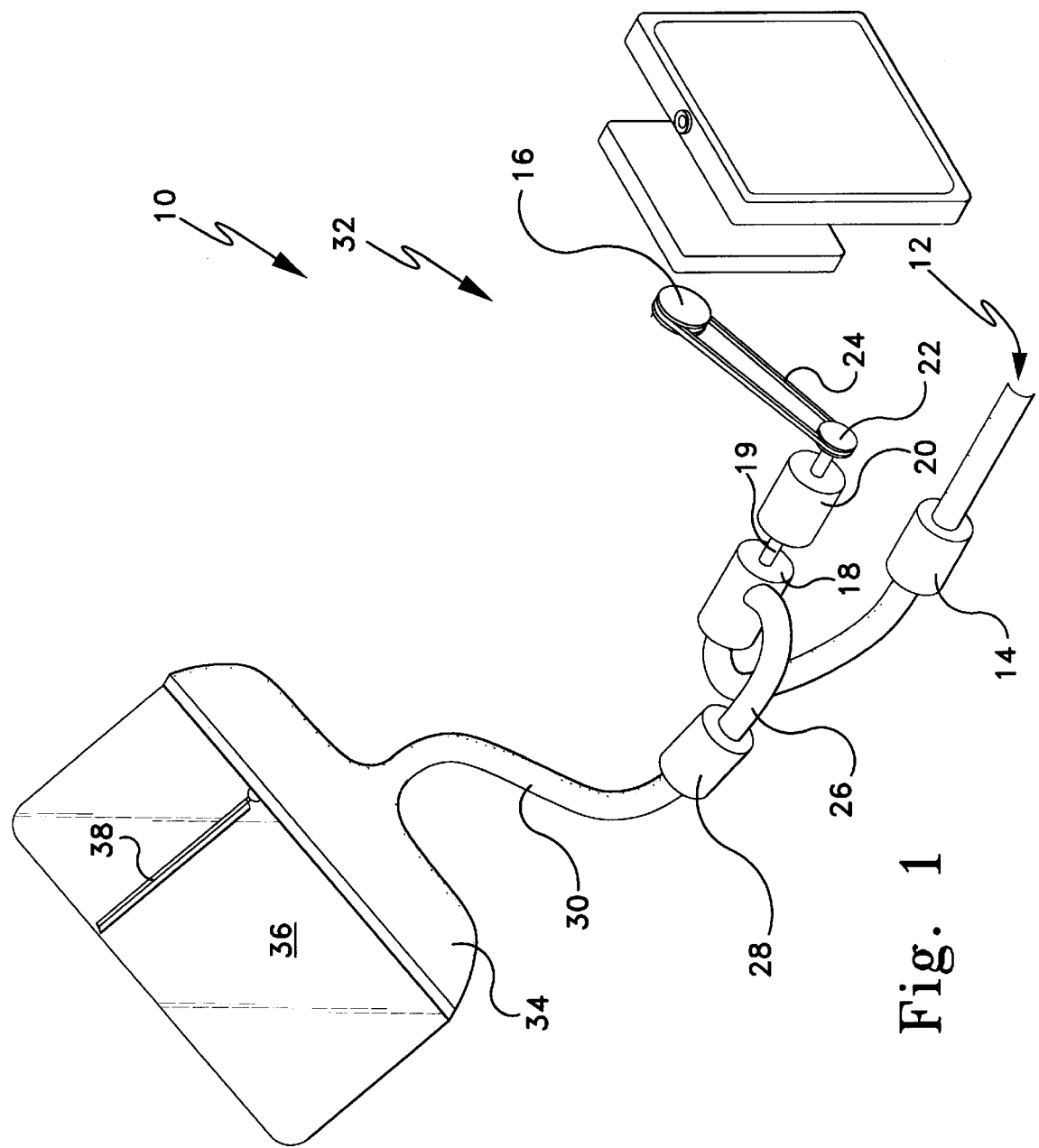
FIG. 1 is an environmental, perspective view of the present invention, showing a first embodiment, a belt driven system.

Turning now to FIG. 1 of the drawings, the first embodiment of the windshield airstream deflector system 10 is illustrated, diagrammatically showing the various elements comprising the system. A multi-stage turbine 18 is provided, rotationally driven at sufficient speeds to generate compressed air flow, as follows.

Power is supplied to the system via a vehicle engine E. When vehicle engine E is operating, pulley wheel 16 rotates. Belt 17 is operably engaged to pulley wheel 16 and electrically controlled clutch 22 of the windshield airstream deflector 10, such that when pulley wheel 16 rotates, clutch 22 likewise rotates, which sends power to a constant speed drive 20 via fixed shaft 13. The constant speed drive 20 is an automatic transmission to maintain a predetermined constant rate of rotation of shaft 19, such transmission being within the ordinary skill and understanding of a person in the art and not therefore detailed herein. The predetermined constant rate of speed of the multi-stage turbine 18 is thereby maintained at a high rate of speed at all times sufficient to generate compressed air.

While constant speed drive 20 is supplying rotational torque to multi-stage turbine 18, multi-stage turbine 18 operates in the conventional manner of turbine engines, wherein a conventional arrangement of turbine blades 121 (FIG. 5) develop compression stages, which are are employed to generate a volume of compressed air. The multi-stage turbine 18 is a high output turbine, producing high pressure air.

Figure 5:
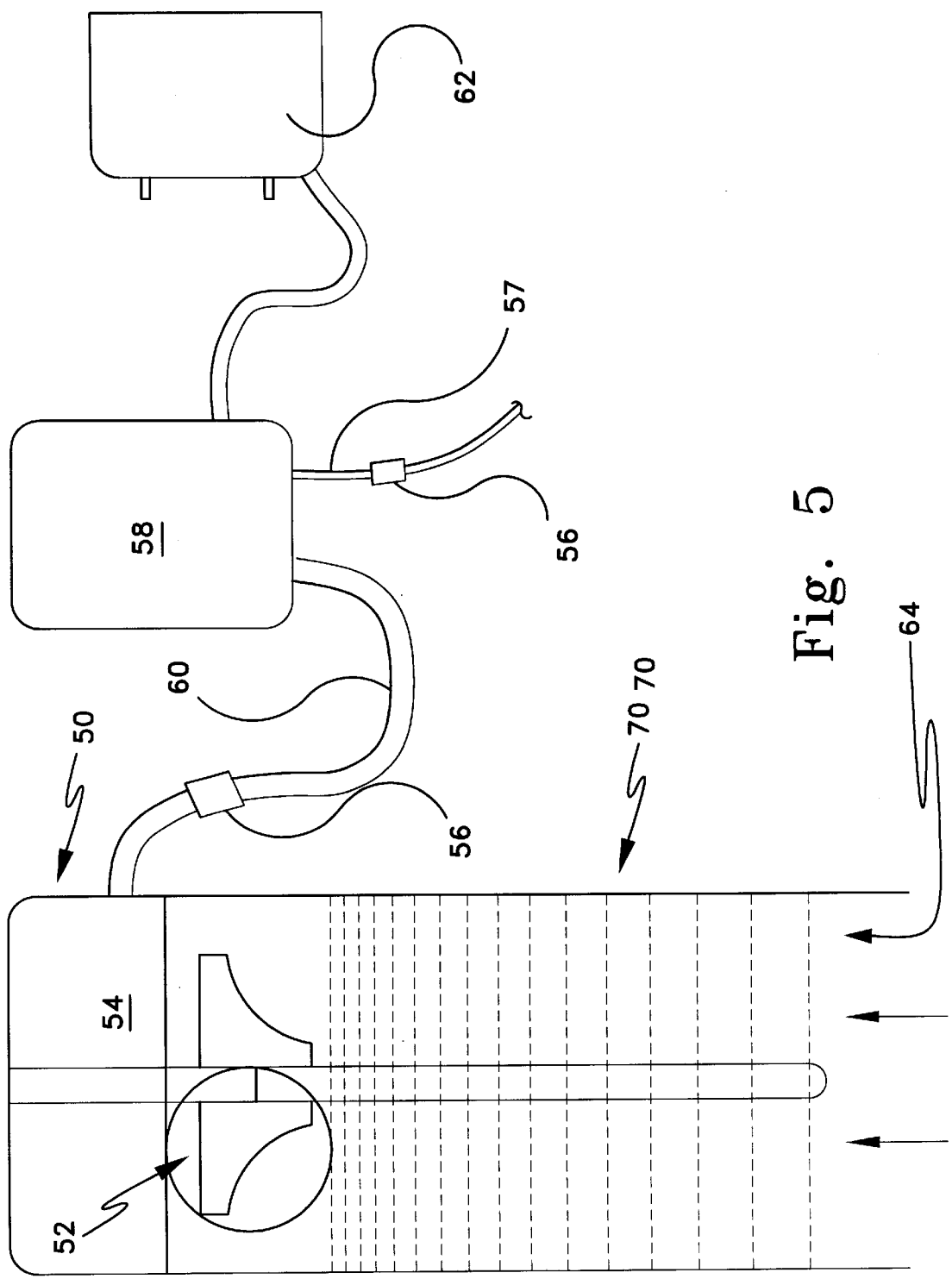
FIG. 5 is a diagrammatic view showing a second embodiment of the present invention, wherein the turbine is powered electrically.

The multi-stage turbine 18 should rotate in a direction to draw ambient air into air intake duct 12. As turbine 18 draws ambient air into air intake duct 12, the air first passes through an air filter 14 to trap airborne particulate matter. Intake duct 12 enters the turbine at inlet port 64, as shown in FIG. 5. As the intake air passes into the interior of turbine 18, the air is passed through the series of turbine blades 121. The air thereby becomes compressed, and the turbine 18 accelerates the air forward, and exits turbine exhaust port 52. The compressed air continues through turbine output duct 26 towards heating element 28.

Heating element 28 raises the temperature of the passing air sufficiently to melt or defrost frozen precipitation. Heated air so generated is particularly useful in defrosting and de-icing the windshield 36, and prevents ice from accumulating upon the windshield 36. The vehicle driver controls the operation of the heating element 28 from within the passager compartment, affected by conventional means known in the prior. The heating element 28 contains a heat transfer element, such as a conventional electrical coil, as known in the prior art. When the heating element 28 is deactivated, the air simply passes through the heating element without heat transfer. Heating element 28 is removably attached between windshield duct 30 and turbine output duct 26 to facilitate replacement if the heating element fails. Removable attachment means such as mating sleeves and collars or the like are suitable for use to facilitate replacement.

The heated air moves through windshield duct 30 and then exits windshield exhaust duct 34 over windshield 36. An equal distribution of air, or "blanket" of air, should completely cover the windshield 36 to act as a buffer against airborne precipitation and particulates from collecting on the windshield 36. As previously noted, the predetermined speed of the blanket of air is dependent upon the output of accelerated and compressed air by the multi-stage turbine 18, which predetermined speed must exceed a threshold ensuring that any moisture reaching the windshield will be removed, and, preventing precipitation from reaching the windshield 36 under most driving conditions. The resulting blanket of air must therefore be projected from the windshield exhaust duct 34 over vehicle windshield 36 with sufficient force to affect the intended result of driving airborne matter over the windshield.

So that there will be no impedance of the airflow over the windshield 36, the wiper blades 38 of a motor vehicle may be reconfigured to rest in a vertical position, as shown in FIG. 1. In the alternative, the windshield exhaust duct 34 could be adapted to project the airflow over the wiper blades 38 to eliminate the need to reconfigure the wiper blades 38. One such adaptation may include elevating the exhaust duct 34 relative to the standard position of wiper blades in a horizontal resting position; for example, the configuration of the exhaust duct 34 could be altered by including a gooseneck bend (not shown) to accomplish such elevation.

Figure 2:
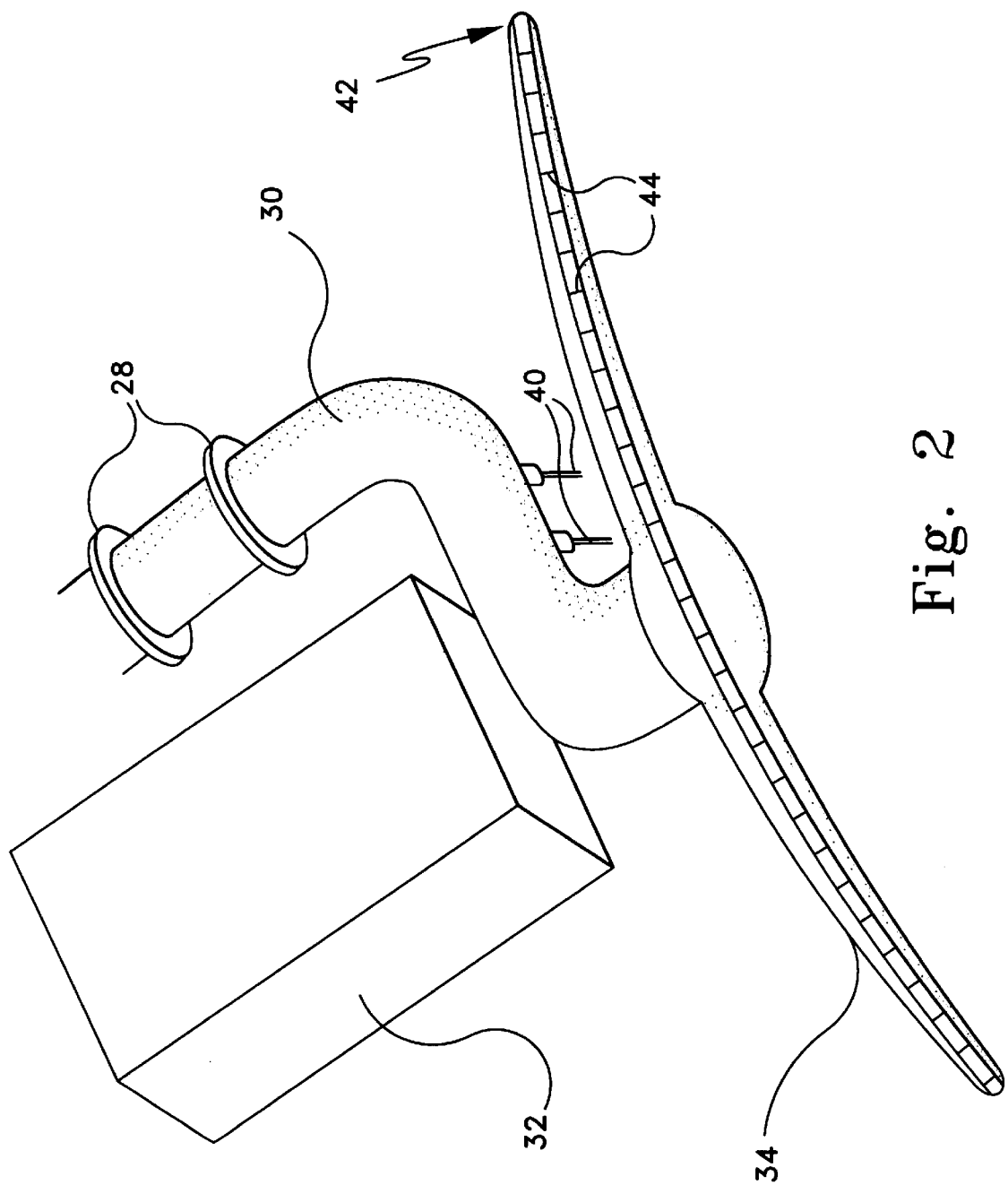
FIG. 2 is an environmental, top perspective view of the present invention, generally viewing the windshield exhaust duct and air nozzle at a downward angle from the vantage point of a vehicle windshield.
Figure 3:
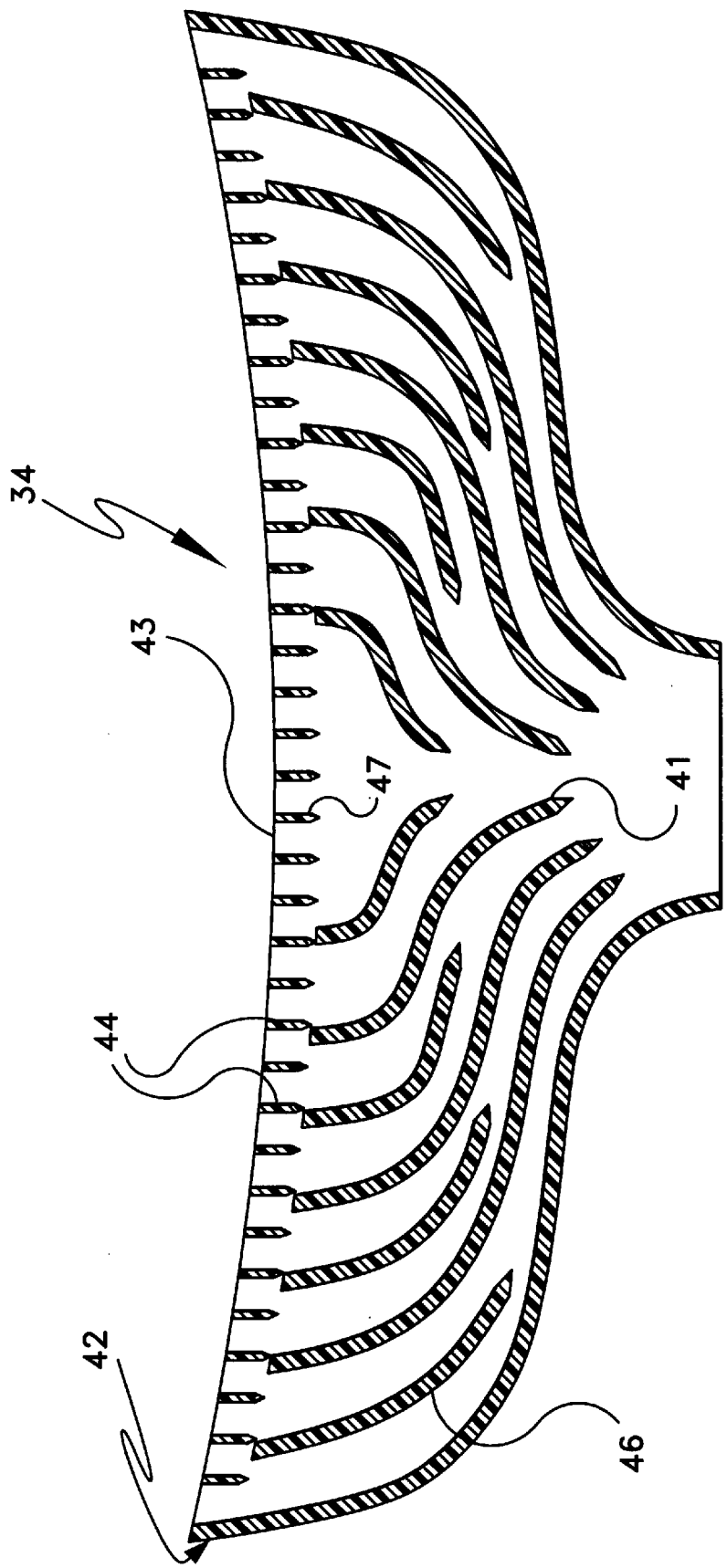
FIG. 3 is a cross sectional view showing the windshield exhaust duct, air nozzle, air flow guides and air nozzle guide configuration of the preferred embodiment of the present invention.

From FIGS. 2 and 3 the path of the high pressure air can be best appreciated. As stated above, as the air passes heating element 28, the air is heated to a sufficient temperature to aid in defrosting or de-icing the windshield 36. Connecting the heating element 28 to the exhaust duct 34 is windshield duct 30. An automatic and/or manual pressure relief valve 40 is located on windshield duct 30 for relieving any buildup of back pressure in the system forward of the turbine 18. The compressed air exits windshield exhaust duct 34 by way of air nozzle 42.

Focusing now on the internal functional design of windshield exhaust duct 34, the duct 34 is configured to equally direct airflow across the length of the windshield 36, as illustrated in FIG. 3 of the drawings. The exhaust duct is oriented with a trailing edge 43 proximate to the windshield. Internal air flow guides 46 originate distal to the trailing edge 43. The air flow guides are spaced outwardly from an imaginary centerline of symmetry passing through the exhaust duct 34 of FIG. 3. The internal air flow guides 46 are further curved outwardly from the centerline to direct substantially equal volumes of airflow towards air nozzle 42 to assist it in diffusing an equal disbursement of air over the windshield.

Figure 4:
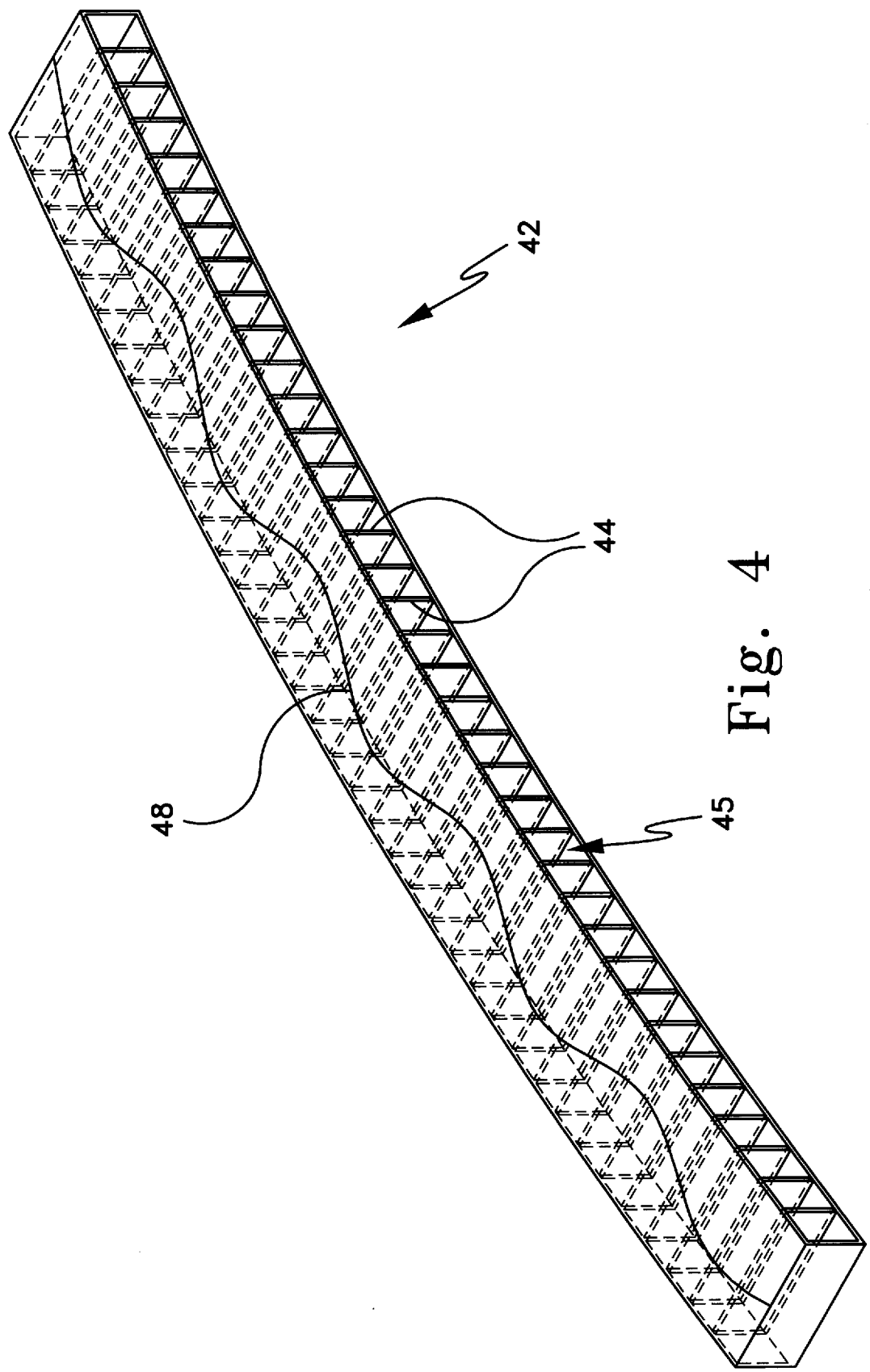
FIG. 4 is a perspective view showing the air nozzle, air nozzle guides and the heating element located upon the air nozzle.

FIG. 4 of the drawings illustrates an enlarged view of the air nozzle 42. The air nozzle 42 comprises a plurality of evenly spaced air nozzle guides 44. Air nozzle guides 44 are shown in FIG. 3 as integrally disposed within windshield exhaust duct 34 along its trailing edge 43. The fin guides 44 ensure that an even dispersion or blanket of air is distributed over the windshield. Each air nozzle guide 44 and each air flow guide 46 has a tapered leading edge, 47 and 41 respectively. The tapered leading edges 47, 41 reduce the amount of air turbulence within windshield exhaust duct 34 and assist in producing an equal disbursement of air over the windshield.

As shown in FIG. 4, an electrical heating filament 48 is disposed upon air nozzle 42 for heating air nozzle 42 to melt any ice or snow that may have formed on air nozzle 42. The electrical heating element 48 is used to melt any ice or snow that may block any of the air channels 45 defined by the air nozzle fin guides 44. Suitable heating filaments and means of operation for activation and deactivation by a user from the passenger compartment as known in the prior art may be incorporated into the present invention.

In order to reduce the effects of the heated air on the windshield exhaust duct 34 or air nozzle 42, special consideration should be made to the type of materials used. The windshield exhaust duct 34 is preferably constructed from heavy durable plastic or fiberglass material. The air nozzle 42 should be made of an alloy metal, to resist cracking due to the high temperature changes caused by the electrical heating element 48, used to de-ice and prevent ice formation on the air nozzle 42.

A second embodiment of the present invention is illustrated in FIG. 5 of the drawings, showing a windshield airstream deflector 70 which is electrical motor driven rather than belt driven. A vehicle battery 62 supplies power to the controller and amplifier 58 which in turn powers D.C. electrical motor 54 via electrical connection 60. Electrical wire 57 is connected to a variable rheostat or other control device located in the dash panel (not shown) for controlling the speed of the D.C. motor 54 and associated turbine 50. Located on electrical connection 60 and electrical wire 57 are electrical overload devices 56 for emergency interruption of the circuit.

The windshield airstream deflector 70 is similar in operation and system structure to the windshield airstream deflector 10 shown in FIG. 1, excepting that the constant speed drive and belt are replaced with the controller 58 and vehicle battery 62, respectively. As previously described, air enters the turbine air compressor 50 at the inlet port 64 and exits toward turbine output duct (as seen in FIG. 1) at the exhaust port 52.

Figure 6:
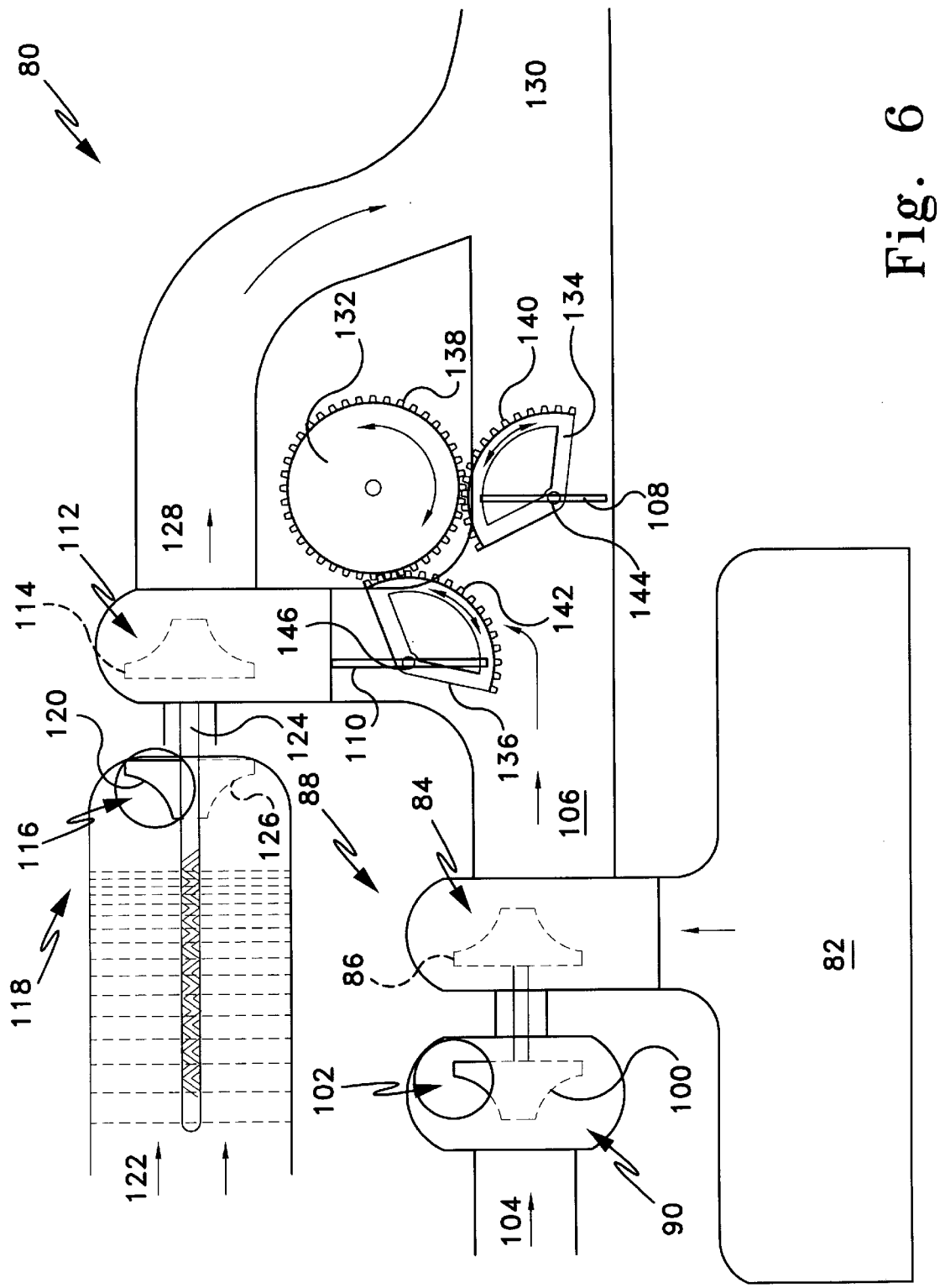
FIG. 6 is a diagrammatic view showing a third embodiment of the present invention, wherein a first turbine is driven by a second turbine enclosed in a exhaust system of a motor vehicle.
Figure 3:
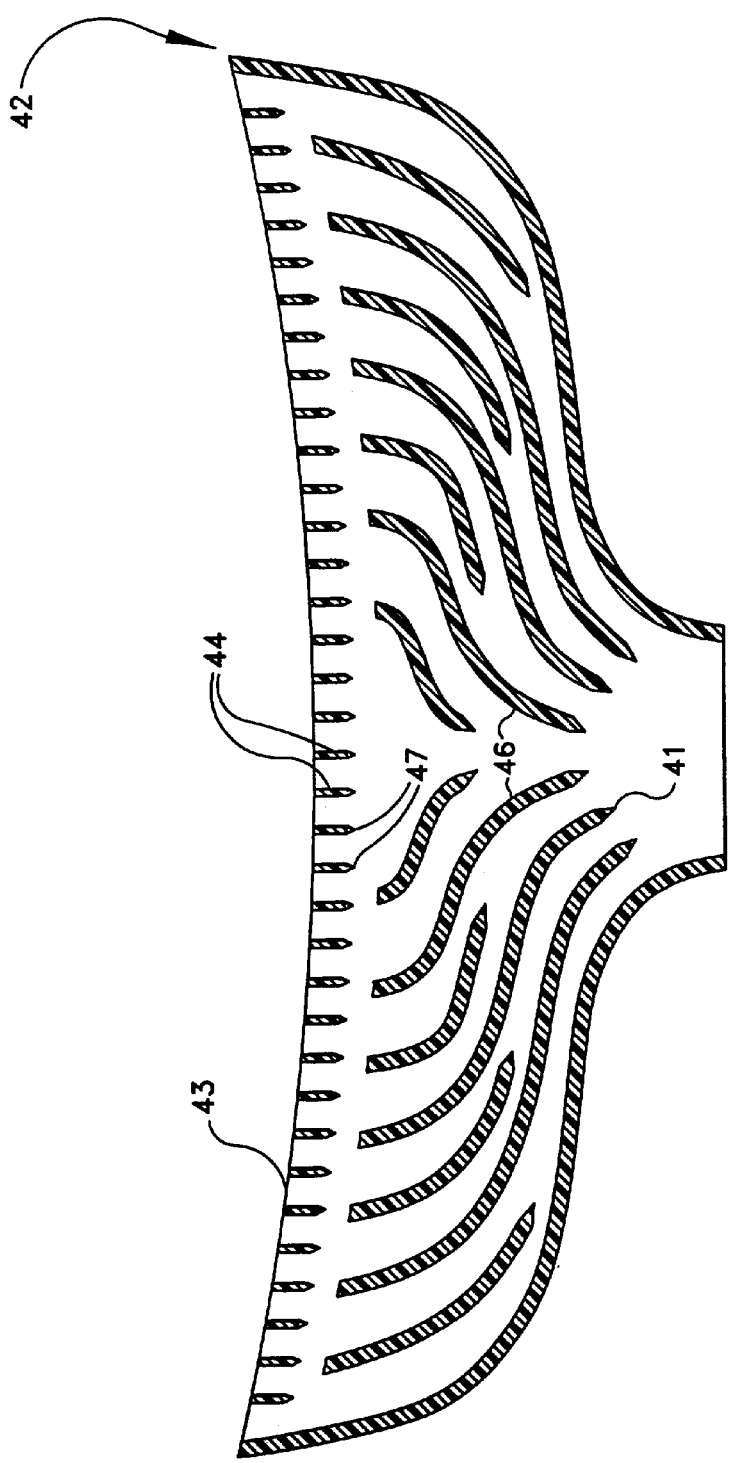
Figure 5:
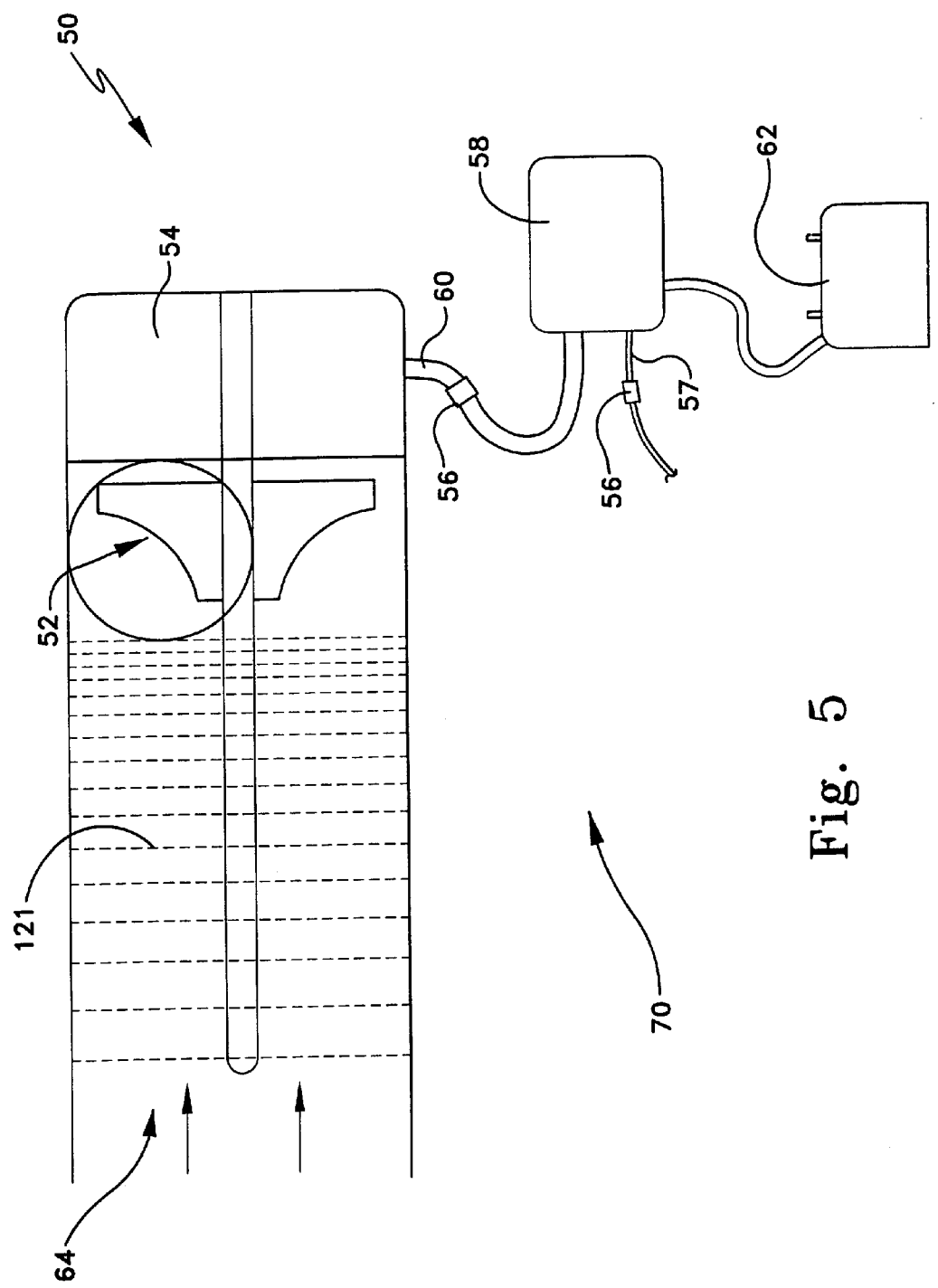

A third embodiment of the present invention is illustrated in FIG. 6, wherein the windshield airstream deflector 80 is driven by a second turbine placed in the exhaust stream of the vehicle's exhaust system, the second turbine being turned by the exhaust pressure and transferring rotational torque to a first turbine of the windshield airstream deflector 80.

Exemplary of a conventional tractor-trailer rig engine, FIG. 6 includes an exhaust system having a first turbo unit 88. During normal operation of the motor vehicle, the exhaust gases pass from an exhaust manifold 82 over turbine 84 of the first turbo unit 88. The exhaust gases drive the blades 86 of turbine 84, which in turn drive the blades 100 of turbine 90 of first turbo unit 88, which cause fresh air drawn through air intake 104 to flow through port 102 to cool the engine. After passing over turbine 86, the exhaust gases ordinarily continue through exhaust channel 106, and towards tail pipe 130.

FIG. 6 further includes the components of the third embodiment. A shunt, namely exhaust output duct 128, is provided as an alternative path for exhaust gases to travel to tailpipe 130. A first valve 134 is disposed in exhaust channel 106 and a second valve 136 is disposed within the exhaust output duct 128. Each valve 134,136 has both an open and closed position. In the open position, the valve allows complete passage of exhaust gases through its associated passage. In the closed position, the passage of exhaust gases is completely occluded, thereby shunting the gases to the alternate passage.

To turn the windshield airstream deflector 80 on and off, the path taken by the exhaust gases through either the shunt or the exhaust channel 106 after leaving first turbine 84 is determined by the position of valve controller 132. The valve controller 132 simultaneously operates both valves 134,136, positioning one valve in an open and the other in a closed position. As shown in FIG. 6, the first valve 134 is in a closed position and the second valve 136 is an open position, i.e. "ON", to shunt exhaust gases towards a second turbo unit 118.

As seen in FIG. 6, valve controller 132 has a plurality of teeth 138 which are dimensioned and configured to mesh with teeth 140 of first valve 134 and teeth 142 of second valve 136. Valve controller 132 is mounted to rotate counterclockwise, which when rotated, forces second valve 136 to rotate clockwise and first valve 134 to rotate clockwise. When first valve 134 rotates clockwise, door 108 pivots at pivot point 144 to block passage of the exhaust to tail pipe 130. Simultaneously, second valve 136 rotates clockwise, pivoting door 110 about pivot point 146 to open passage of the exhaust gases to second turbo unit 118.

To deactivate the system, i.e. "OFF", valve controller 132 rotates clockwise, which forces second valve 136 to rotate counterclockwise thus rotating door 110 such that the exhaust is prevented from reaching second turbo unit 118. Similarly, when valve controller 132 rotates clockwise, first valve 134 rotates counterclockwise which rotates door 108 in an open position which allows the exhaust to proceed straight through to the tail pipe 130. Any suitable means of controlling valve controller 132 from the passenger compartment of the motor vehicle may be used, as is known in the prior art. It should also be noted that although the valves 134,136 and valve controller 132 are shown as mechanically operated cog wheel assemblies, other suitable means of valve operation embodying the principle of its intended operation may be used.

In the ON position, the exhaust gases enter turbine 112 of second turbo unit 118. Second turbo unit 118 includes turbine 112 and multi-stage turbine 120, each turbine operating in a closed system relative to the other. The turbine 112 and multi-stage turbine 120 are operably connected by turbo shaft 124. Impeller blades 114 terminate turbo shaft 124 and are disposed within the stream of exhaust gases. As gases pass over impeller blade 114 causing it to rotate, impeller blades 126 and blades 121 of multi-stage turbine 120 are caused to rotate. The rotation of blades 126,121 draw air from air intake 122 into multi-stage turbine 120 and across blades 121 which compress and expel air out of exhaust port 116 into the exhaust duct 26 (of FIG. 1). Exhaust gases leave turbine 112 and pass through exhaust output duct 128 out tail pipe 130.

An on/off switch for the air/rain deflector system, an on/off switch for heating element 28, an on/off switch for electrical heating element 48 and a variable rheostat for controlling the speed of the turbine (attaches to the controller 58) are all located on the dash panel of the vehicle to give the vehicle driver complete control over the entire system.

Each embodiment requires that the multi-stage turbine produce a continous high volume, high pressure air flow. Because of the high revolutions per minute necessary, the turbine may incorporate magnetic bearings and mechanical ceramic bearings. These type bearings have the following advantages: (1) no maintenance, they are lubricated for life; (2) very high reliablity due to silicon nitride (ceramic) bearings; and (3) lower vibration characteristics over turbines with steel bearings. Moreover, the multi-stage turbine unit may incorporate polymer blades and adapted to employ a cooling system of a convection, forced air and/or water type.

It is to be understood that the present invention is not limited to the embodiments described above, but encompasses any and all embodiments within the scope of the following claims.

I claim:

1. A windshield airstream deflector for motor vehicles having a windshield, comprising:

a multi-stage turbine for compressing ambient air to a high pressure and high velocity compressed air, said multi-stage turbine having an air intake for receiving ambient air and an exhaust, port for expulsion of compressed air;

a powering means for driving said multi-stage turbine;

means for selectively controlling operation of said multi-stage turbine;

an output duct for ducting said compressed air from said exhaust port; and, a windshield exhaust duct attached to said turbine output duct and positioned on the motor vehicle proximately below a windshield for dispensing a volume of said compressed air from said turbine substantially equally over the entire length of the windshield of the motor vehicle, said windshield exhaust duct including a body defining an air passage having a neck flaring into an enlarged cavity exiting at a trailing edge of said body and a plurality of air flow guides originating proximate to said neck and terminating proximate to said trailing edge, each of said plurality of air flow guides proportionally spaced apart from one another across said enlarged cavity to define a plurality of widening channels within said enlarged cavity.

2. The windshield airstream deflector according to claim 1, further comprising a heater element for heating said compressed air passing through said output duct, said heater element disposed on said output duct.

3. The windshield airstream deflector according to claim 1, further comprising air filtering means for filtering said ambient air passing into said air intake.

4. The windshield airstream deflector according to claim 1, wherein each of said plurality of air flow guides has a tapered leading edge.

5. The windshield airstream deflector according to claim 1, further comprising a plurality of air nozzle guides parallel, evenly spaced apart, and disposed within said cavity along said trailing edge.

6. The windshield airstream deflector according to claim 5, wherein each of said plurality of air nozzle guides has a tapered leading edge.

7. The windshield airstream deflector for vehicles according to claim 1 wherein said air nozzle further comprises an electrical heating element.

8. A windshield airstream deflector for motor vehicles having a windshield, comprising:

a multi-stage turbine for compressing ambient air to a high pressure and high velocity compressed air, said multi-stage turbine having an air intake for receiving ambient air and an exhaust port for expulsion of compressed air;

a powering means for driving said multi-stage turbine;

means for selectively controlling operation of said multi-stage turbine;

an output duct for ducting said compressed air from said exhaust port;

an exhaust duct attached to said turbine output duct and positioned on the motor vehicle proximately below a windshield for dispensing a volume of said compressed air from said turbine substantially equally over the entire length of the windshield of the motor vehicle; and an air nozzle disposed within said exhaust duct, wherein said air nozzle comprises a plurality of air nozzle guides parallel, evenly spaced apart, and wherein each of said plurality of air nozzle guides has a tapered leading edge.

9. The windshield airstream deflector according to claim 1 wherein said powering means comprises a belt-driven, electrically controlled clutch, a constant speed drive operably linked to said clutch, and a shaft operably attached to said constant speed drive for transferring torque to said multi-stage turbine.

10. The windshield airstream deflector for vehicles according to claim 1 wherein said powering means comprises:

a d.c. motor for driving said multi-stage turbine; and, a battery, a controller and amplifier operably linked to said d.c. motor.

11. A windshield airstream deflector for motor vehicles having an exhaust system including an exhaust channel for expelling exhaust gases, comprising;

a shunt from the exhaust channel for by-passing exhaust gases through said shunt;

valve means for selectively directing exhaust gases from said exhaust channel through said shunt;

a turbo unit, comprising
      a multi-stage turbine for compressing ambient air to a high pressure and high velocity compressed air, said multi-stage turbine having an air intake for receiving ambient air and an exhaust port for expulsion of compressed air, and
      a first impeller disposed in said shunt for driving said multi-stage turbine, said impeller rotably mounted within said shunt and responsive to exhaust gas pressure such that said impeller rotates;

an output duct for ducting said compressed air from said exhaust port; and, an exhaust duct attached to said turbine output duct and positioned on the motor vehicle proximately below a windshield, said exhaust duct for dispensing a volume of said compressed air from said turbine substantially equally over the entire length of the windshield of the motor vehicle.

12. The windshield airstream deflector according to claim 11, further comprising a heater element for heating said compressed air passing through said output duct, said heater element disposed on said output duct.

13. The windshield airstream deflector according to claim 11, further comprising air filtering means for filtering said ambient air passing into said air intake.

14. The windshield airstream deflector according to claim 11, wherein said windshield exhaust duct comprises:

a body defining an air passage having a neck flaring into an enlarged cavity exiting at a trailing edge of said body; and a plurality of air flow guides originating proximate to said neck and terminating proximate to said trailing edge, each of said plurality of air flow guides proportionally spaced apart from one another across said enlarged cavity to define a plurality of widening channels within said enlarged cavity, wherein each of said plurality of air flow guides has a tapered leading edge.

15. The windshield airstream deflector according to claim 14, further comprising a plurality of air nozzle guides parallel, evenly spaced apart, and disposed within said cavity along said trailing edge, wherein each of said plurality of air nozzle guides has a tapered leading edge.

16. The windshield airstream deflector for vehicles according to claim 14, wherein said air nozzle further comprises an electrical heating element.

17. The windshield airstream deflector according to claim 11 wherein said valve means further comprises:

a first valve assembly disposed within said shunt;

a second valve assembly disposed within said exhaust channel; and, a valve controller for selectively opening said first valve assembly for passage of exhaust gases through said shunt while closing said second valve assembly for occlusion of exhaust gases through said exhaust channel, and closing said first valve assembly for occlusion of exhaust gases through said shunt while opening said second valve assembly for passage of exhaust gases through said exhaust channel.

18. The windshield airstream deflector according to claim 17, wherein said valve controller comprises a cog wheel rotatably mounted to the motor vehicle external to said exhaust channel and said shunt;

wherein said first valve assembly comprises a first door disposed within said shunt and affixed to a first arcuate rack, said first arcuate rack meshed with said cog wheel and pivotally responsive to rotation of said cog wheel; and, wherein said second valve assembly comprises a second door disposed within said exhaust channel and attached to a second arcuate rack, said second arcuate rack meshed with said cog wheel and pivotally responsive to rotation of said cog wheel.

* * * * *

UNITED STATES PATENT AND TRADEMARK OFFICE
CERTIFICATE OF CORRECTION

PATENT NO.   : 5,852,846
DATED        : December 29, 1998
INVENTOR(S)  : E. H. Gonzalez It is certified that error appears in the above-identified patent and that said Letters Patent is hereby corrected as shown below:

Drawings,
Delete drawings sheets 3 of 6 and 5 of 6 and substitute the drawing sheets consisting of Figs. 3 and 5 as shown on the attached pages.

Signed and Sealed this

First Day of April, 2003

JAMES E. ROGAN
*Director of the United States Patent and Trademark Office*